(12) United States Patent
Bletsos et al.

(10) Patent No.: US 9,848,543 B2
(45) Date of Patent: Dec. 26, 2017

(54) SYSTEM AND METHOD FOR IRRIGATION (71) Applicant: E I DU PONT DE NEMOURS AND COMPANY, Wilmington, DE (US)

(72) Inventors: Ioannis V Bletsos, Midlothian, VA (US); Robert R Matheson, Glen Allen, VA (US); Debora Flanagan Massouda, Wilmington, DE (US); Ji Yeon Huh, Newark, DE (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 0 days.

(21) Appl. No.: 14/307,893

(22) Filed: Jun. 18, 2014

(65) Prior Publication Data

US 2015/0016888 A1 Jan. 15, 2015

Related U.S. Application Data

(60) Provisional application No. 61/843,994, filed on Jul. 9, 2013.

(51) Int. Cl.
*A01G 25/06* (2006.01)
(52) U.S. Cl.
CPC .................................. *A01G 25/06* (2013.01)
(58) Field of Classification Search
CPC ....................................................... A01G 25/06
See application file for complete search history.

(56) References Cited

U.S. PATENT DOCUMENTS

| | | | |
|---|---|---|---|
| 3,081,519 A | 3/1963 | Blades et al. |
| 3,169,899 A | 2/1965 | Steuber |
| 3,227,784 A | 1/1966 | Blades et al. |
| 3,338,992 A | 8/1967 | Kinney |
| 3,341,394 A | 9/1967 | Kinney |
| 3,502,763 A | 3/1970 | Hartman |
| 3,542,615 A | 11/1970 | Dobo et al. |

(Continued)

FOREIGN PATENT DOCUMENTS

| | | |
|---|---|---|
| CN | 201986476 | 9/2011 |
| EP | 0683793 | 11/1995 |
| WO | WO02/08288 | 10/2002 |

OTHER PUBLICATIONS

PCT International Search Report and Written opinion for International Application No. PCT/US2014/044072 dated Oct. 1, 2014.

(Continued)

*Primary Examiner* — Benjamin F Fiorello (57) ABSTRACT

A method for subsurface irrigation having the steps of; providing one or more hydrophobic porous uncoated tubes having a hydro head (HH), locating the tubes with at least a portion of their length within the rhizosphere of plants to be irrigated, and passing an aqueous irrigation liquid into the tubes during the growth phase of the plants to be irrigated at an applied pressure at or below HH. The tubes may be located in the proximity of seeds which become the plants to be irrigated following their germination. In this embodiment, aqueous irrigation fluid is passed into the tubes during a germination phase of the seeds at an applied pressure that is at least 10% higher than the applied pressure during the growth phase of the plants.

18 Claims, 5 Drawing Sheets

(56) References Cited

U.S. PATENT DOCUMENTS

| | | | |
|---|---|---|---|
| 3,692,618 A | | 9/1972 | Dorschner et al. |
| 3,802,818 A | | 4/1974 | Watanabe et al. |
| 3,830,067 A | | 8/1974 | Osborn et al. |
| 3,849,241 A | | 11/1974 | Butin et al. |
| 3,851,023 A | | 11/1974 | Brethauer et al. |
| 3,939,875 A | * | 2/1976 | Osborn .................. A01G 25/06 138/119 |
| 4,235,561 A | | 11/1980 | Peterson |
| 4,340,563 A | | 7/1982 | Appel et al. |
| 4,526,733 A | | 7/1985 | Lau |
| 5,160,746 A | | 11/1992 | Dodge, II et al. |
| 7,748,930 B2 | † | 7/2010 | Gesser |
| 2005/0254899 A1 | * | 11/2005 | Tyler ...................... E02B 3/125 405/15 |
| 2014/0047766 A1 | † | 2/2014 | Larue |

OTHER PUBLICATIONS

Water Resistance:Hydrostatic Pressure Test, AATCC Test Method 127-2014, Technical Manual/2015, p. 225-226.
A. Augsburg, Determination of contact angles and solid surface tensions of poly(4-X-styrene) films, Acta Polym. 1998, 49, 417-426.
International Irrigation Systems, Inc., Irrigate With Irrigro Irrigation Systems—About Us, self-published at http://www.irrigro.com, viewed at https://web.archive.org/web/20070717174545/http://www.irrigro.com/index.php?option=com_content&task=view&id=8&Itemid=42 (archived website image from Jul. 17, 2007 that includes a 2006 copyright statement).†

\* cited by examiner
† cited by third party

SYSTEM AND METHOD FOR IRRIGATION

FIELD OF THE INVENTION

The present invention is directed to the field of agriculture, and in particular methods for irrigation and, more particularly, to subsurface irrigation systems and to flexible conduits or tubing particularly adapted for irrigation systems.

BACKGROUND OF THE INVENTION

Surface irrigation systems in which a network of troughs or ditches is formed in the earth's surface for conveying and distributing water to plants, trees and the like in arid areas or those afflicted with a drought are well known. Also, it is well known to employ underground piping systems for conveying water to outlets or sprinkler heads disposed at or above ground level for discharging or spraying such water on adjacent vegetation. Although these systems are often admirably suited for the purposes for which they were designed, they also have certain disadvantages. For example, in open ditch irrigation water wastage from evaporation and deep seepage in porous soils can be extensive. On the other hand, in non-porous soils water tends to collect and stagnate in pools thereby creating pollution problems and providing breeding areas for mosquitoes and other insects. In the use of sprinkler or spray systems, water is wasted by evaporation, insecticides are often washed off plants, thereby negating their purpose and needlessly contaminating the soil. Also, in some instances, the resultant wet foliage promotes plant diseases.

In view of experience with the above-mentioned systems, it has been found that underground or subsurface irrigation systems offer many advantages over surface irrigation systems. However, subsurface systems have in many instances been impracticable because of the high cost of providing and laying out suitable piping and the expensive accessory equipment such as high pressure pumps, flow regulating devices, and the like, required with such systems. Moreover, their performance has often been unsatisfactory since the water outlet perforations or orifices in these underground pipes become clogged, thus reducing efficiency and making it even more difficult to control properly the rate of flow of water delivered therefrom and to confine the delivered water to the desired area.

Microporous membranes of hydrophilic materials have been used in sub surface irrigation systems. For example, U.S. Pat. No. 3,830,067 to Osborn discloses permeable tubing through which water may pass with negligible pressure drop. U.S. Pat. No. 7,748,930 to Gesser discloses a microporous tubing of a hydrophobic material with a hydrophilic coating.

The present inventors have discovered that microporous membranes of uncoated hydrophobic materials with inherent resistance to water flow have unexpectedly high water flow rates in the presence of plants even at head pressures below their hydrostatic head pressure (hydrohead.) These materials unexpectedly interact with plants to provide a regulated and optimized water or irrigant flow, in particular over longer distances than are otherwise possible.

SUMMARY OF THE INVENTION

The present invention is directed to a method for subsurface irrigation comprising the steps of;

i. providing one or more hydrophobic porous tubes that are not coated with a hydrophilic material and into which an aqueous irrigation fluid is supplied to one or more of the tubes, wherein the tubes comprise materials having a hydrohead (HH);

ii. locating the tubes with at least a portion of their length in the proximity of a plurality of plants to be irrigated that are in their growth phase;

iii. passing the aqueous irrigation liquid into the tubes during said growth phase of the plants to be irrigated, at an applied pressure (Pgrowth) at or below HH;

In one embodiment of the process of the invention the tubes are configured such that the aqueous irrigation fluid enters the tube configuration and is pressurized therein such that the minimum length of tubing between the irrigation fluid entry point and at least one of the plants to be watered is 61 meters and the HH of at least a portion of the one or more tubes is at least 100 cmwc.

In a further embodiment the tubes are placed within the rhizosphere of the plants. In a still further embodiment plant roots grow toward the tubes and the tubes become part of the rhizosphere.

In a further embodiment of the method the tubes are located in the proximity of seeds before step (i), and aqueous irrigation fluid is passed through the tubes during the germination phase of the seeds at a head pressure that is at least 10% higher than HH, and the seeds mature into the plants to be irrigated.

In a still further embodiment the method includes the additional step of passing the aqueous irrigation fluid through the tubes before step (ii) at a head pressure that is at least 10% higher than Pgrowth for a first period. The hydrophobic porous uncoated tubes may comprise walls of fibrous material located on the external walls of the tubes, and the fibrous material is a nonwoven web. The nonwoven web may furthermore comprise a plexifilamentary web, a spunbond web, a meltblown web or a combination of the preceding, for example a spunbond/meltblown/spunbond (SMS) structure. The nonwoven web may furthermore be calendered.

The one or more tubes may further comprise segments that differ in hydrohead.

The hydrohead of the one or more tubes in any of the above embodiments may be 1.5 meters or greater. The applied pressure during the growth phase (Pgrowth) in any of the above embodiments may be less than or equal to 1.5 meters.

In a further embodiment, the method comprises the steps of i. providing one or more hydrophobic porous uncoated tubes having a hydrohead (HH) and locating the tubes with at least a portion of their length in the proximity of seeds to be germinated, ii. passing a sufficient quantity of aqueous irrigation liquid through the tubes at an applied pressure (Pgermination) during germination of the seeds, iii. allowing the germinated seeds to enter a growth phase, iv. passing an aqueous irrigation liquid through the tubes during said growth phase of the plants to be irrigated, at an initial applied pressure (Pinitial) for a time T1, and v. lowering the head pressure of said aqueous irrigation liquid in the tubes during said growth phase of the plants to be irrigated, to an applied pressure (Pgrowth) that is at or below HH, wherein Pgermination is 10% or greater than HH, Pinitial is equal to or greater than Pgrowth and wherein the tubes are configured such that the aqueous irrigation fluid enters the tube configuration and fills the tubes to at least a distance of 61 meters from the point at which applied pressure Pgrowth is applied.

In a still further embodiment the invention is directed to a system for use in subsurface irrigation of plants comprising;
  i. one or more porous tubes that are not coated with a hydrophilic material and that are arranged in a configuration, wherein the one or more tubes each have an enclosing wall and an interior space contained thereby such that the tubes' interior spaces are in fluid contact, and one or more of the enclosing walls comprise sections that have a hydrohead (HH) equal to or greater than 100 cmwc,
  ii. an exterior region that is a continuous space that is exterior to the tubes and contains a growth medium for plants,
  iii. aqueous irrigation fluid located in the interior space of the one or more of the tubes and held at an applied pressure (Pgrowth),
  iv. a plurality of plants that are in their growth phase and whose roots are located in the exterior region,
  v. an irrigation fluid entry point where aqueous irrigation fluid may enter the interior space of the tubes;
wherein the tubes are located with at least a portion of the length of at least one tube in the proximity of a plurality of roots of plants to be irrigated, and the irrigation fluid entry point is located such that the minimum length of tubing between the irrigation fluid entry point and at least one of the plants to be watered is 61 meters.

In the irrigation system the pressure Pgrowth may be at or below HH, Furthermore all of the tubing between the irrigation fluid entry point and the plant may be located at least 61 meters from the irrigation fluid entry point, and have HH greater than or equal to 100 cmwc.

The growth medium of the system embodiment may further be soil.

DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "polymer" as used herein, generally includes but is not limited to, homopolymers, copolymers (such as for example, block, graft, random and alternating copolymers), terpolymers, etc., and blends and modifications thereof. Furthermore, unless otherwise specifically limited, the term "polymer" shall include all possible geometrical configurations of the material. These configurations include, but are not limited to isotactic, syndiotactic, and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene, and various combinations of the monomers ethylene, propylene, and methylpentene.

The term "polyethylene" as used herein is intended to encompass not only homopolymers of ethylene, but also copolymers wherein at least 85% of the recurring units are ethylene units such as copolymers of ethylene and alpha-olefins. Preferred polyethylenes include low-density polyethylene, linear low-density polyethylene, and high-density polyethylene. A preferred high-density polyethylene has an upper limit melting range of about 130° C. to 140° C., a density in the range of about 0.941 to 0.980 gram per cubic centimeter, and a melt index (as defined by ASTM D-1238-57T Condition E) of between 0.1 and 100, and preferably less than 4.

The term "polypropylene" as used herein is intended to embrace not only homopolymers of propylene but also copolymers where at least 85% of the recurring units are propylene units. Preferred polypropylene polymers include isotactic polypropylene and syndiotactic polypropylene.

The term "plexifilament" as used herein means a three-dimensional integral network or web of a multitude of thin, ribbon-like, film-fibril elements of random length. Typically, these have a mean film thickness of less than about 4 micrometers and a median fibril width of less than about 25 micrometers. The average film-fibril cross sectional area if mathematically converted to a circular area would yield an effective diameter between about 1 micrometer and 25 micrometers. In plexifilamentary structures, the film-fibril elements intermittently unite and separate at irregular intervals in various places throughout the length, width and thickness of the structure to form a continuous three-dimensional network. Examples of plexifilamentary webs are those produced by the processes described in U.S. Pat. No. 3,081,519 (Blades et al.), U.S. Pat. No. 3,169,899 (Steuber), U.S. Pat. No. 3,227,784 (Blades et al.), U.S. Pat. No. 3,851,023 (Brethauer et al.), the contents of which are hereby incorporated by reference in their entirety. Examples of commercially available plexifilamentary webs are the sheets suppled by the DuPont company of Wilmington, Del. under the name Tyvek®.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

The as-spun nonwoven of the present invention can be consolidated by processes known in the art (e.g. calendering) in order to impart the desired improvements in physical properties. The term "consolidated" generally means that the nonwoven has been through a process in which it is compressed and its overall porosity has been reduced. In one embodiment of the invention the as-spun nonwoven is fed into the nip between two unpatterned rolls in which one roll is an unpatterned soft roll and one roll is an unpatterned hard roll. The temperature of one or both rolls, the composition and hardness of the rolls, and the pressure applied to the nonwoven can be varied to yield the desire end use properties. In one embodiment of the invention, one roll is a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint between the two rolls is the machine direction (MD) distance that the web travels in contact with both rolls simultaneously. The footprint is controlled by the pressure exerted at the nip between the two rolls and is measured generally in force per linear cross-direction (CD) dimension of roll, and is preferably between about 1 mm and about 30 mm.

Further, the nonwoven web can be stretched, optionally while being heated to a temperature that is between the glass-transition temperature ($T_g$) and the lowest onset-of-melting temperature ($T_{om}$) of the fiber polymer. The stretching can take place either before and/or after the web passes through the calender roll nip, and in either or both of the MD or CD.

The term "continuous" when applied to fibers means that the fibers have been laid down during the manufacture of a nonwoven structure in one continuous stream, as opposed to being broken or chopped.

"Meltblown fibers" are fibers formed by extruding a molten thermoplastic material through a plurality of fine, usually circular, die capillaries as molten threads or filaments into converging, usually hot and high velocity, gas, e.g. air, streams to attenuate the filaments of molten thermoplastic material and form fibers. During the meltblowing process, the diameter of the molten filaments is reduced by the drawing air to a desired size. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin et al., U.S. Pat. No. 4,526,733 to Lau, and U.S. Pat. No. 5,160,746 to Dodge, I I et al., all of which are hereby incorporated herein by this reference. Meltblown fibers may be continuous or discontinuous.

As used herein the term "spunbond fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763, and U.S. Pat. No. 3,542,615 to Dobo et al. Spunbond fibers are generally continuous and larger than 7 microns, more particularly, they are usually between about 15 and 50 microns.

Spunbond and meltblown fibers can be laminated together, for example into spunbond-meltblwon-spunbond structures, designated here as "SMS." The SMS structures can also be calendered.

By "rhizosphere" is meant the narrow region of soil that is directly influenced by root secretions and associated soil microorganisms. Soil which is not part of the rhizosphere is known as bulk soil. For example, the rhizosphere contains many bacteria that feed on sloughed-off plant cells, termed rhizodeposition, and the proteins and sugars released by roots.

By "proximity", when used in the context of the tubes' position relative to a plant or a seed, is meant that when water exudes from the tube or tubes, at least a portion of it contacts the seeds. Such contact may be direct, by capillary action through bulk soil or the rhizosphere, or by a combination of these factors.

By "aqueous irrigation fluid" is meant any fluid with an aqueous continuous phase that may contain salts, or other materials in solution, suspension or dispersion that is intended for application in the rhizosphere or in the proximity of plants or seeds.

By "tube configuration" is meant the particular arrangement of tubes that supply irrigation fluid to the plants or seeds. For example, one linear tube (104 in FIG. 1) can be supplied by one source of fluid. (See 103 in FIG. 1) Alternatively, multiple tubes whose interiors are in fluid contact with each other (see 202 and 203 in FIG. 2) can be supplied from one or more fluid sources (201 in FIG. 2.) The particular arrangement of tubes employed is a matter of choice for the user and among other factors will depend on the geography of the area to be irrigated. Each tube will have a wall, that may be referred to herein as an enclosing wall. The enclosing wall separates the interior of the tube from the exterior region where growth medium and plants are located.

By "in fluid contact" means that a fluid such as an irrigation fluid will fill the interior spaces of all of the tubes when it is introduced into any one of the tubes. An irrigation fluid entry point is an opening through which irrigation fluid is introduced to the tube configuration.

By "growth medium" is meant any material in which the plants are rooted. For example any type of soil as understood by one of skill in the agricultural arts. The growth medium is located exterior to the tubes and the tube walls provide a barrier between the interior space that contains irrigation fluid and the continuous exterior region that contains the growth medium.

Hydrostatic head or "hydrohead" (AATCC TM 127-194) is a convenient measure of the ability of a fabric to prevent water penetration. It is presented as the pressure, in centimeters of water column (cmwc), required to force liquid water through a hydrophobic fabric. By "hydrophobic" is therefore meant that a material has a tendency to resist water, and a microporous membrane or web will typically have a non-zero hydrohead. Typically, hydrophobic materials as referred to herein will have a contact angle with water of at least 80 degrees.

The present invention is directed to a method for subsurface irrigation comprising the steps of;
  i. providing one or more hydrophobic porous uncoated tubes having a hydro head (HH) and locating the tubes with at least a portion of their length in the proximity of plants to be irrigated that are in their growth phase,
  ii. passing an aqueous irrigation liquid through the tubes at an applied pressure (Pgrowth) at or below HH.

The irrigation process can be divided into two phases that represent the phases of the life of the plant. For example, two of the phases may be the germination and growth phases of the seed and plant. In one embodiment, the method includes the step in which the tubes are located in the proximity of seeds that are in a germination phase before step (i), and aqueous irrigation fluid is passed into the tubes during said germination phase of the seeds at an applied pressure that is at least 10% higher than HH, and the seeds mature into the plants to be irrigated.

Germination may take place in the presence of water from the tube or tubes, or it may take place in the presence of water from natural sources, for example rain. It may take place in the presence of both sources of water.

In a still further embodiment the method includes the additional step of passing the aqueous irrigation fluid into the tubes before step (ii) at a head pressure that is at least 10% higher than HH for a first period.

The tubes may be configured such that the aqueous irrigation fluid enters the tube configuration and is pressurized therein such that the minimum length of tubing between the irrigation fluid entry point and at least one of the plants to be watered is 61 meters and the HH of at least a portion of the one or more tubes is at least 100 cmwc. The tubes may also be configured such that the minimum length of tubing between the irrigation fluid entry point and at least one of the plants to be watered is at least 100, 200, 500 or even 600 meters from at least one of the plants to be watered and the HH of at least a portion of the one or more tubes is at least 100 cmwc.

Figure 1:
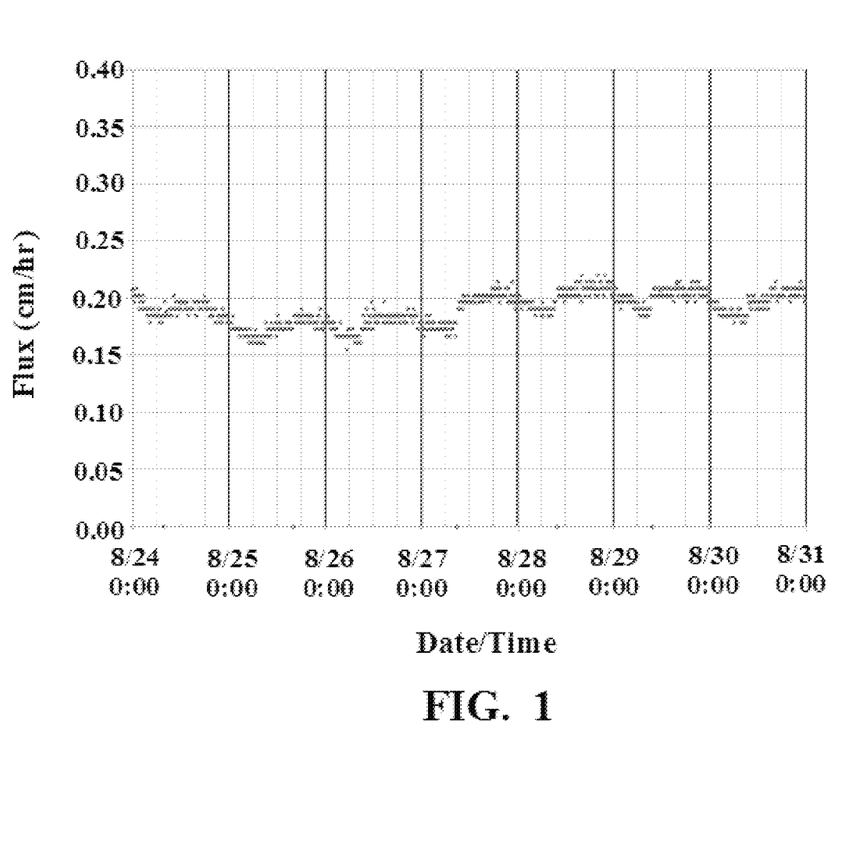
FIG. 1 shows a schematic side view of a tube being supplied by fluid from an entry point and supplying plants.
Figure 2:
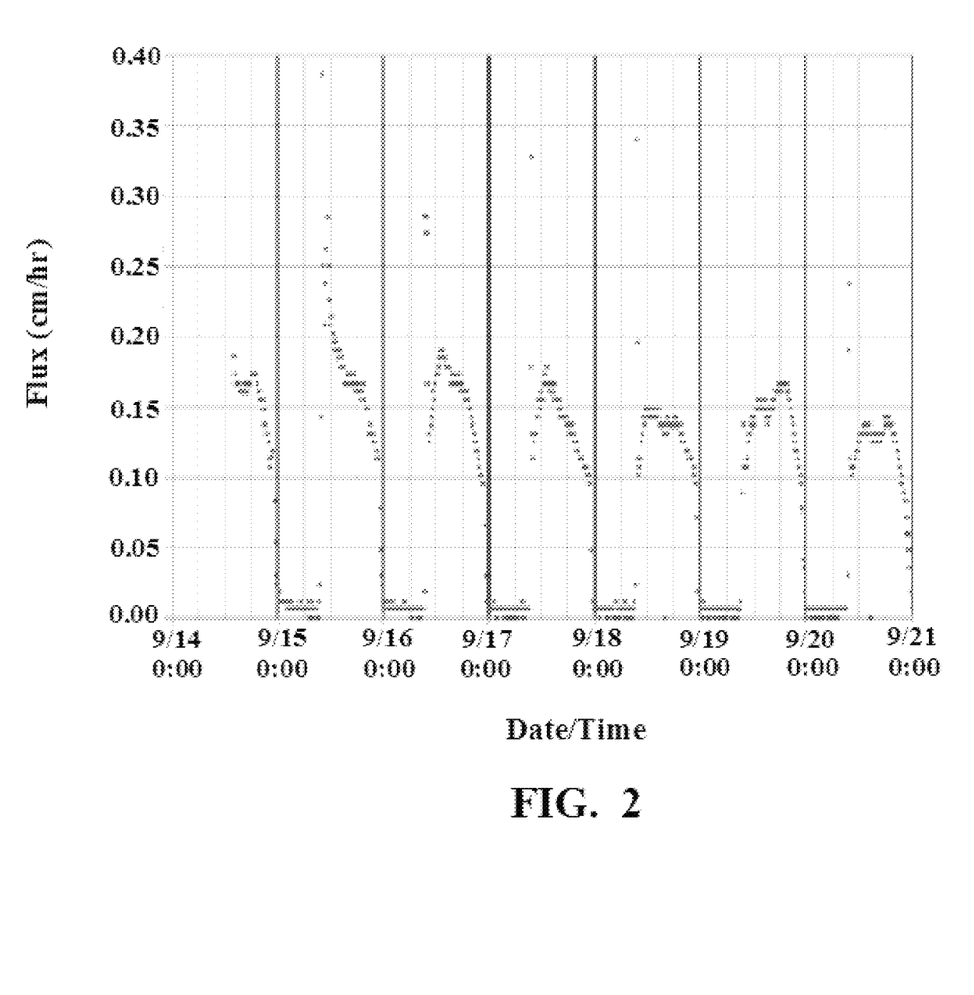
FIG. 2 shows a schematic plan view of one possible arrangement multiple tubes in fluid contact with each other and being supplied from an entry point.

The hydrophobic porous uncoated tubes, 104, 202, 203, may comprise walls of fibrous material located on the external walls of the tubes, and the fibrous material may be a nonwoven web. The nonwoven web may furthermore comprise a plexifilamentary web, a spunbond web, a meltblown web or a combination of the preceding. The nonwoven web may furthermore be calendered.

In one example, the uncoated tube is a cylindrical tube ⅝" (1.58 cm) ID, or 0.5"-⅞' (1.27-2.22 cm), or larger made of uncoated webs:

The term "SMS" refers to a trilaminate structure of a spunbond, meltblown and spunbond fiber composition.

Manufacturing processes to make the product would be known to one of skill in the art. For example, a single layer of plexifilamentary web slit approximately 2.5" (6.35 cm) wide is formed into a tube around a mandrel and a heated element above it. An overlap of 0.25" (0.635 cm) where the two edges of Tyvek® meet is heated for a few seconds to about 140-145° C. under pressure to form a lap heat seal. The formed tube is pulled and is wound onto a reel. The steps are repeated and the tube that could be as long as 10,000 feet (3048 meters) or longer is wound on a reel.

In a still further embodiment, the method comprises the steps of;
i. providing one or more hydrophobic porous uncoated tubes, for example 104, 202, 203, into which an aqueous irrigation fluid is supplied to one or more of the tubes, wherein the tubes comprise materials having a hydrostatic pressure head (HH);
ii. passing a sufficient quantity of aqueous irrigation liquid into the tubes at an applied pressure Pgermination during germination of the seeds;
iii. allowing the germinated seeds to enter a growth phase;
iv. passing an aqueous irrigation liquid into the tubes during said growth phase of the plants to be irrigated, at an applied pressure (Pinitial) for a time T1; and
v. lowering the head pressure of said aqueous irrigation liquid in the tubes during said growth phase of the plants to be irrigated, to an applied pressure (Pgrowth) that is at or below HH;

The applied pressure Pgermination in this embodiment is 10% or greater more than HH, and Pinitial is equal to or greater than Pgrowth. The tubes are configured such that such that the minimum length of tubing between the irrigation fluid entry point and at least one of the plants to be watered is 61 meters and the HH of at least a portion of the one or more tubes is at least 100 cmwc.

The time T1 may be in the range of one day to one week (7 days.)

The invention is further directed to a system for subsurface irrigation of plants.

The system comprises one or more porous tubes, for example 104, 202, 203, that are not coated with a hydrophilic material and that are arranged in a configuration, wherein the one or more tubes each have an enclosing wall and an interior space contained thereby such that the tubes' interior spaces are in fluid contact (202,203.) One or more of the enclosing walls comprise sections that have a hydrohead (HH) equal to or greater than 100 cmwc, The system contains an exterior region (for example, 101 and 102 in FIG. 1) that is a continuous space that is exterior to the tubes and contains a growth medium for plants. An aqueous irrigation fluid is located in the interior space of the one or more of the tubes and held at an applied pressure (Pgrowth).

The system further comprises a plurality of plants 105, 204 that are in their growth phase and whose roots (106) are located in the exterior region and an irrigation fluid entry point where aqueous irrigation fluid may enter the interior space of the tubes;

The tubes are located with at least a portion 203 of the length of at least one tube in the proximity of a plurality of roots of plants to be irrigated, and the irrigation fluid entry point is located such that the minimum length of tubing between the irrigation fluid entry point (101 and 201) and at least one of the plants 105, 204 to be watered is 61 meters.

In the irrigation system the pressure Pgrowth may be at or below HH, Furthermore all of the tubing between the irrigation fluid entry point and the plant may be located at least 61 meters from the irrigation fluid entry point, and have HH great than or equal to 100 cmwc.

EXAMPLES

Hydrostatic head pressure (Hydrohead or HH) measurements on web samples were run on a Textest Instruments FX3000 Hydrotester per method AATC TM 127. Hydrohead was recorded at the first and third water drop penetration and is reported in centimeters of water column (cmwc) as the pressure at the third water drop penetration.

Gurley Hill Porosity is a measure of the barrier of the sheet material for gases. In particular, it is a measure of how long it takes for a volume of gas to pass through an area of material wherein a certain pressure gradient exists. Gurley-Hill porosity is measured in accordance with TAPPI T-460 om-88 using a Lorentzen & Wettre Model 121 D Densometer. This test measures the time of which 100 cubic centimeters of air is pushed through a 2.54 cm diameter sample under a pressure of approximately 12.45 cm of water. The result is expressed in seconds and is usually referred to as Gurley Seconds.

Frazier air permeability is a measure of air permeability of porous materials and it was measured according to ASTM D737. In this measurement, a pressure difference of 124.5 $N/m^2$ (0.5 inches of water column) is applied to a suitably clamped fabric sample and the resultant air flow rate is measured and reported in units of $ft^3/ft^2/min$ using a Sherman W. Frazier Co. dual manometer with calibrated orifice.

Plexifilametary webs of Tyvek® were obtained from DuPont, Wilmington, Del. and were variously prepared by the processes described in U.S. Pat. No. 3,081,519 (Blades et al.), U.S. Pat. No. 3,169,899 (Steuber), U.S. Pat. No. 3,227,784 (Blades et al.), U.S. Pat. No. 3,851,023 (Brethauer et al.).

The following properties were measured on samples. Sample A in table 1 was an SMS sample obtained from Midwest Filtration Co., (Cincinnati, Ohio) All other samples were of Tyvek®.

TABLE 1

| Sample | Basis Weight (oz/yd$^2$) | HH (cm water column) | Gurley (sec) | Frazier ft$^3$/min/ft$^2$ |
|---|---|---|---|---|
| A | 2.75 | 60 | NA | 30 |
| B | 1.5 | 100 | NA | 0.6 |
| 1 | 1.6 | 80 | NA | 4.6 |
| 2 | 1.0 | 145 | 20 | NA |
| 3 | 2.2 | 150 | 22 | NA |
| 4 | 1.8 | 290 | 1200 | NA |
| 5 | 2.7 | 416 | 4180 | NA |

Example 1

Soybeans were grown from seeds with irrigation through plexifilamentary nonwoven tubing (sample 3) with a hydrohead of 150 cmwc, Minute-by-minute water flux through the web was measured.

Sample Preparation

A wooden trough, lined with plastic sheeting, was placed in a growth chamber. Trough dimensions were: 91.5 inches (232 . . . 4 cm) long×20 inches (50.8 cm) deep×18 inches (45.7 cm) wide. The trough was filled 9 inches (22.9 cm) deep with soil (a 50/50 blend of Matapeake and sand).

The web of sample 3 was formed into tubing and was placed on top of the soil. The tubing used had an inflated diameter of ⅝ inches. The tubing was covered with 4 inches (11.6 cm) of the same soil Soybean seeds (type B73) were planted 1-inch (2.5 cm) deep and 2 inches (5.1 cm) apart. The tubing was connected to a water reservoir located on a lift table to provide the desired head pressure. The reservoir was placed on a scale which was hooked to a computer for data-logging. The growth chambers were programmed to shine light (both fluorescent and incandescent bulbs) for 14 hours a day and to be dark for 10 hours a day.

Water Application and Germination

Tubing was filled with water overnight with an applied pressure of 50 cm.

A head pressure of 1.7 meters was applied for 5 days to deliver water for germination. It had been estimated from smaller scale studies that 24 liters in this volume would be required for germination. When a total of 24 liters had been added, the water was turned off. The water was then kept off for 6 days because moisture was sufficient for germination. Essentially all seeds germinated.

Growth Period

Applied pressure was increased to 1.0 m for 2 hours and then increased to 1.5 meters. The applied pressure was held at 1.5 m for the remainder of the life cycle. Six days after the pressure had been set to 1.5 m, a 100 ppm fertilizer solution (Peters Professional 20/20/20) replaced the water in the reservoir feeding the irrigation tubing in the trough. As water flowed through the transfer lines, out through the Tyvek® and into the trough, the water level did drop in the reservoir. The reservoir was refilled by hand and was not allowed to drop below 1.4 m head pressure.

Water weight in the reservoir was recorded every minute, and flow rates were calculated by difference. The temperature and relative humidity (RH) were typically: 35° C. and 30% RH with the lights on, and 25° C. and 52% RH with the lights off.

Figure 3:
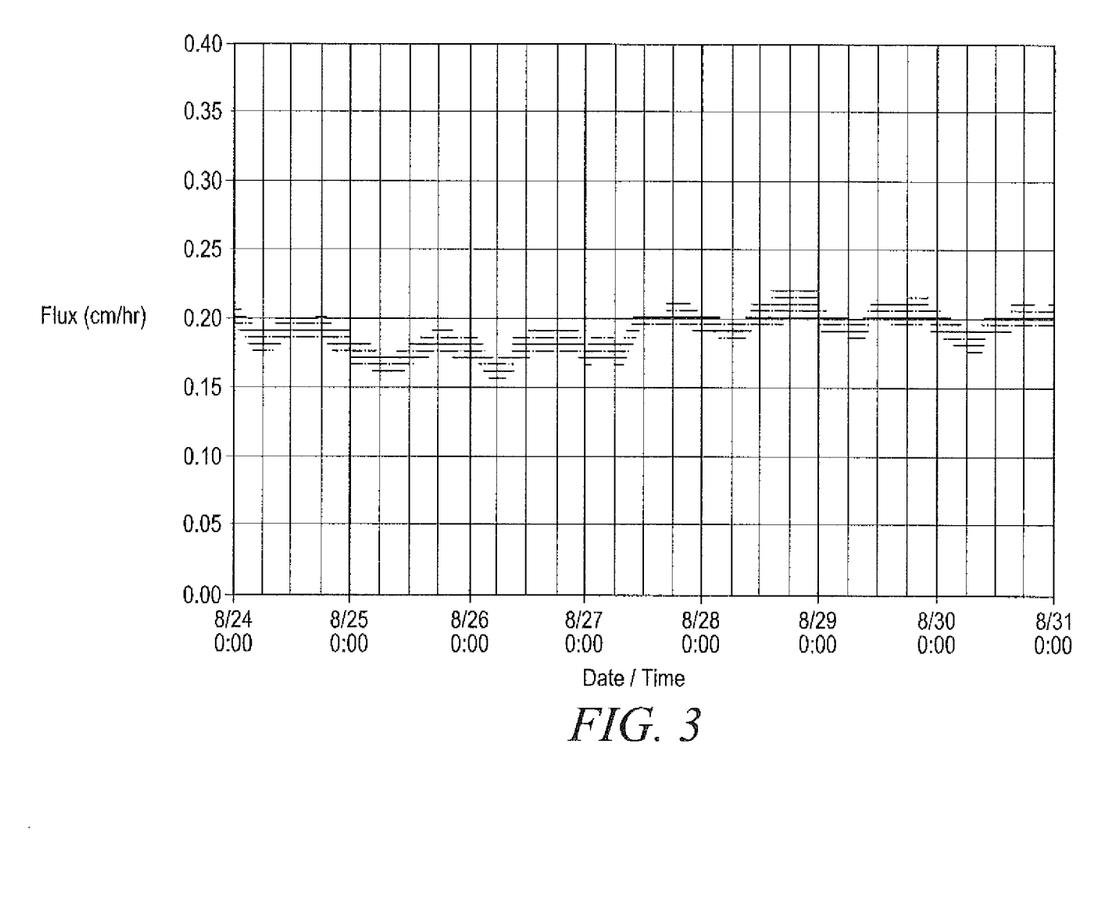
FIG. 3 shows the water uptake by the soy bean plants of the example treated by the method of the invention.

Results showed that the flow of the water from the reservoir typically cycled between light and dark periods, with more water taken from the reservoir during the day. FIG. 3 below shows one week of these cycles, as measured during week 6 of this experiment. The y-axis shows flux through the plexifilamentary tubing. This can be converted to a flow rate in gallons/hour/100 ft by multiplying these values by 4.0 (for this ⅝ inch diameter tubing). For example, for this size tubing a flux of 0.2 cm/hr is equal to a flow rate of 0.8 gallons/hour/100 ft.

Figure 4:
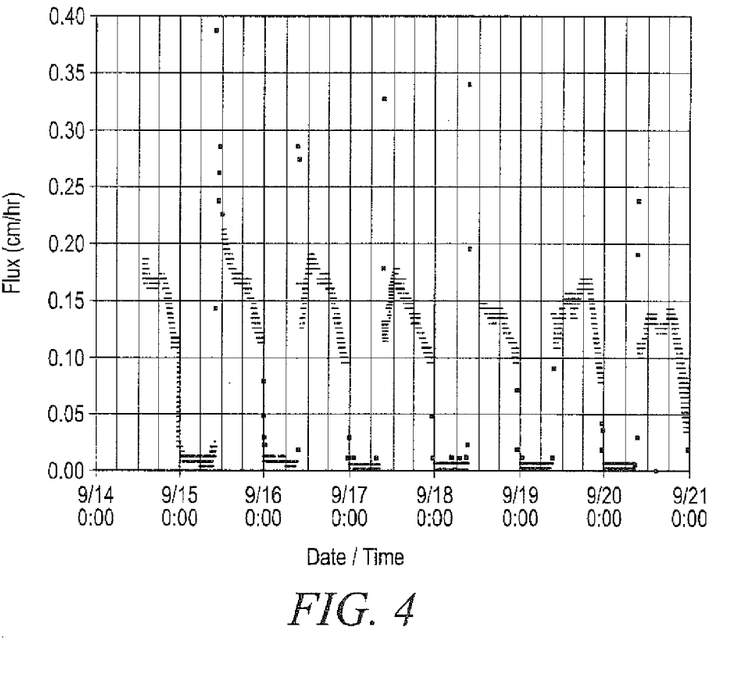
FIG. 4 shows another example of water uptake by soy bean plants.

During the seventh week of this experiment, half of the soy plants were cut at surface. Plants were removed with as little disturbance to the soil or tubing as possible, while everything else continued as described above. Later in the plant life cycle as less water was required by the plant, less water was drawn in. This is shown, for example in the results from Week 9, in FIG. 4.

This experiment showed that this water came directly from the tubing as it was required by the plant. The flux of water is also higher than would be expected based on the hydrohead of the hydrophobic tube material and the head pressure of 1.5 m. Based on the definition of hydrohead as the point where water flow just begins, the flow is higher than this negligible amount and is being controlled by the plant growth. Even though all the settings remain unchanged during the majority of this experiment, the plant ended its life cycle by drawing less water.

Example 2

Two equal halves split from the same Pothos plant were planted into two pots of the same material and size using potting soil. A tube made of web sample 3 tied tightly at one end was inserted vertically into the pot holding Pothos part 1 within 2.5 cm from its roots (invention example 2). The tube was 12.2 cm long, of which 2.6 cm were exposed to air and 9.6 cm were buried in the soil and it had a diameter of 1.4 cm.

Another piece of tubing cut from the same tube of sample 3 tied at its end was also buried in the middle of a pot containing the same type of potting soil but with no plant (2.5 cm exposed to air and 9.7 cm buried in the soil) (Comparative A—no plant).

The second half of the Pothos plant was planted exactly as Invention example 2 but without any tubing, it was not watered (Comparative B—control) and its pot was placed next to invention example 1 and the Comparative A on a counter top.

The tubes were connected through flexible tubing to 500 mL graduated cylinders which were filled with water to the same level. The vertical distance from the water level in the graduated cylinder to the bottom of the tube is the applied head pressure which ranged from 106-82 cmwc (cm water column), which is much lower that the hydrohead of web example 3 at 150 cmwc. The volume of the water in the cylinder was measured twice a day, the time was recorded and the water flow rate through the tube was calculated from the volume and the elapsed time. The water in the cylinders was replenished to keep the head pressure the same for the invention examples and the soil control, and within the range of 106-82 cmwc.

Table 2 summarizes the samples.

TABLE 2

| Sample | Plant | Tyvek ® Tube |
|---|---|---|
| Example 2 | Yes | Yes |
| Comparative A | No | Yes |
| Comparative B | Yes | No |

Figure 5:
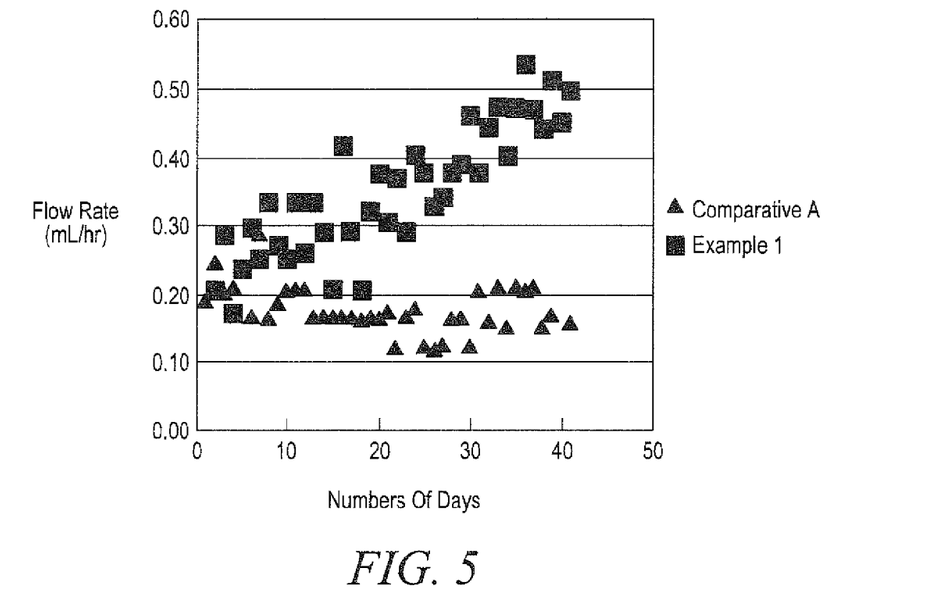
FIG. 5 shows a further example of the water uptake of plants using the method of the invention.

FIG. 5 shows the water flow rate out of the tubes for Example 2 and Comparative A vs. the number of days of the tubes in the pots. After the first few days the flow rate of Example 2 increased relative to Comparative A which indicates that the plant draws water out of the tube. Eventually the flow rate of Example 2 increased to about 2.5 times that of the soil in Comparative A. At the applied head pressure of 82-106 cmwc very little if any no flow is expected out of the tube having a hydrohead of 150 cmwc. The flow rate of Comparative A remains constant above the moisture transmission rate of 0.1 mL/hr. calculated for the water vapor loss out of the exposed segment of the tube. The plant of Example 2 looked healthy unlike Comparative B which was visibly distressed and eventually died without any water.

It will be evident that lengths or sections of the novel, flexible, pervious or permeable tubing of the present invention can be joined together as desired to provide any required length. For example, the ends of tubing sections can be merely placed over the ends of a tubular nipple and held in place thereon by clamping means. Such means may be a metal or plastic mechanical clamp, or a plastic barbed threaded connector, or may be merely a ring of a heat-shrinkable plastic, for example, an irradiated polyolefin or polyvinyl chloride, which when heated to cause shrinking thereof, firmly clamps the tubing on the nipple.

The tubing of the invention can be constructed of flexible strips bonded together. The flexible strips from which tubing according to the present invention is formed are preferably of heat-weldable thermoplastic. Various thermoplastic materials may be employed, the choice being influenced by cost, degree of flexibility and durability desired, and the environment in which the tubing will be used. Among generally suitable thermoplastic materials are polyolefins, polyvinyl chloride, fluorinated hydrocarbons, polyesters, nylons, polyacrylates, other polymerized vinyl esters and vinyl copolymers, and silicone rubber. However, as pointed out below, non-thermoplastic, flexible strips may be employed if desired. It may be pointed out here that, if desired, any or all of the strips used in forming the present novel tubing may be reinforced with embedded wires or filaments, e.g., glass fibers.

Example 3

Tubes based on various plexifilamentary web styles and SMS were installed in a sandy soil field at various lengths and number of tube segments. The tubes were installed 10 in (25.4 cm) below the ground surface and they were collapsed under the weight of the sandy soil. Then they were connected to water at head pressures at the same or greater than their hydroheads and the time to fill their entire lengths was recorded. Plexifilamentary web styles with hydroheads above 150 cmwc were filled to the end of the tubes in less than 24 hours while SMS and a plexifilamentary web with HH≤100 cmwc could not be filled past 61 meters. Table 3 summarizes the results.

TABLE 3

| Tube Material | HH (cmwc) | Pgrowth (cmwc) | No. of Tube Segments | Tube Segment Length (meters) | Time to Fill to Tube End (hrs) |
|---|---|---|---|---|---|
| 3 | 150 | 190 | 6 | 168 | <24 |
| 3 | 150 | 160 | 4 | 107 | <24 |
| 3 | 150 | 150 | 4 | 107 | <24 |
| Hybrid | 150/290 | 150 | 6 | 107 | <24 |
| A | 60 | 90 | 4 | 171 | Filled only to 61 m |
| 3 | 150 | 160 | 6 | 165 | <24 |
| B | 100 | 140 | 3 | 159 | Filled only to 61 m |
| 3 | 150 | 140 | 1 | 61 | <24 |
| A | 60 | 130 | 3 | 149 | Filled only to 61 m |

The invention claimed is:

1. A method for subsurface irrigation of plants or seeds comprising the steps of;
    i. providing one or more hydrophobic porous tubes that are not coated with a hydrophilic material into which an aqueous irrigation fluid is supplied to one or more of the tubes, wherein the tubes comprise materials having a hydrohead (HH);
    ii. locating the tubes with at least a portion of their length in the proximity of a plurality of plants to be irrigated that are in their growth phase;
    iii. passing the aqueous irrigation liquid into the tubes during said growth phase of the plants to be irrigated, at an applied pressure (Pgrowth) at or below HH;
wherein the tubes are in fluid contact with each other and are configured in a configuration such that the aqueous irrigation fluid enters the tube configuration and is pressurized therein such that the minimum length of tubing between the irrigation fluid entry point and at least one of the plants to be watered is 61 meters and the HH of at least a portion of the one or more tubes is at least 100 cmwc, and wherein, once filled with fluid, the tubes will remain filled when the applied pressure is removed.

2. The method of claim 1 in which at least a portion of the length of the tubes are located within the rhizosphere of at least one of the plants.

3. The method of claim 1 in which the tubes are located in the proximity of seeds that are in their germination phase before step (i), and aqueous irrigation fluid is passed into the tubes during said germination phase of the seeds at a head pressure that is at least 10% higher than HH, and the seeds mature into the plants to be irrigated.

4. The method of claim 1 including the additional step of passing the aqueous irrigation fluid into the tubes before step (ii) at a head pressure that is at least 10% higher than Pgrowth for a first period.

5. The method of claim 1 wherein the hydrophobic porous uncoated tubes comprise walls of fibrous material located on the external walls of the tubes and wherein the fibrous material is a nonwoven web.

6. The method of claim 5 wherein the nonwoven web comprises a plexifilamentary web, a spunbond web, a melt-blown web or a combination of the preceding.

7. The method of claim 1 in which the one or more tubes comprise segments that differ in hydrohead.

8. The method of claim 1 in which the hydrohead of the one or more tubes is 150 cmwc or greater.

9. The method of claim 1 in which the head pressure is less than or equal to 1.5 meters.

10. A method for subsurface irrigation of plants or seeds comprising the steps of;
   i. providing one or more porous uncoated tubes into which an aqueous irrigation fluid is supplied to one or more of the tubes, wherein the tubes are in fluid contact with each other and comprise materials having a hydrostatic pressure head (HH);
   ii. passing a sufficient quantity of aqueous irrigation liquid into the tubes at an applied pressure Pgermination during germination of the seeds;
   iii. allowing the germinated seeds to enter a growth phase;
   iv. passing an aqueous irrigation liquid into the tubes during said growth phase of the plants to be irrigated, at an applied pressure (Pinitial) for a time T1; and
   v. lowering the head pressure of said aqueous irrigation liquid in the tubes during said growth phase of the plants to be irrigated, to an applied pressure (Pgrowth) that is at or below HH;
wherein applied pressure Pgermination is 10% or greater more than HH, and Pinitial is equal to or greater than Pgrowth and wherein the tubes are configured such that the aqueous irrigation fluid enters the tube configuration and is pressurized therein such that the minimum length of tubing between the irrigation fluid entry point and at least one of the plants to be watered is 61 meters and wherein the HH of at least a portion of the one or more tubes is at least 100 cmwc and wherein, once filled with fluid, the tubes will remain filled when the applied pressure is removed.

11. The method of claim 10 in which T1 is between 1 and 7 days.

12. A system for use in subsurface irrigation of plants comprising;
   i. one or more porous tubes that are not coated with a hydrophilic material and that are arranged in a configuration, wherein the one or more tubes each have an enclosing wall and an interior space contained thereby such that the tubes' interior spaces are in fluid contact, and one or more of the enclosing walls comprise sections that have a hydrohead (HH) equal to or greater than 100 cmwc,
   ii. an exterior region that is a continuous space that is exterior to the tubes and contains a growth medium for plants,
   iii. aqueous irrigation fluid located in the interior space of the one or more of the tubes and held at an applied pressure (Pgrowth),
   iv. a plurality of plants that are in their growth phase and whose roots are located in the exterior region,
   v. an irrigation fluid entry point where aqueous irrigation fluid may enter the interior space of the tubes,
wherein the tubes are located with at least a portion of the length of at least one tube in the proximity of a plurality of roots of plants to be irrigated, and the irrigation fluid entry point is located such that the minimum length of tubing between the irrigation fluid entry point and at least one of the plants to be watered is 61 meters and, wherein once filled with fluid, the tubes will remain filled when the applied pressure is removed.

13. The system of claim 12 wherein the pressure Pgrowth is at or below HH.

14. The system of claim 12 wherein all of the tubing between the irrigation fluid entry point and the plant located at least 61 meters from the irrigation fluid entry point, has HH great than or equal to 100 cmwc.

15. The system of claim 12 wherein the growth medium is soil.

16. The method of claim 1 in which the hydrophobic porous tubes have a contact angle with water of at least 80 degrees.

17. A method for subsurface irrigation of plants or seeds comprising the steps of
   (i) providing one or more hydrophobic porous tubes that are not coated with a hydrophilic material into which an aqueous irrigation fluid is supplied to one or more of the tubes, wherein the tubes comprise materials having a hydrohead (HH), locating the tubes with at least a portion of their length in the proximity of a plurality of plants to be irrigated that are in their growth phase;
   (ii) passing the aqueous irrigation liquid into the tubes during said growth phase of the plants to be irrigated, at an applied pressure (Pgrowth) at or below HH;
   (iii) wherein the tubes are in fluid contact with each other and are configured in a configuration such that the aqueous irrigation fluid enters the tube configuration and is pressurized therein such that the minimum length of tubing between the irrigation fluid entry point and at least one of the plants to be watered is at least 200 meters and the HH of at least a portion of the one or more tubes is at least 100 cmwc, and wherein, once filled with fluid, the tubes will remain filled when the applied pressure is removed.

18. The method of claim 17, wherein the minimum length of tubing between the irrigation fluid entry point and at least one of the plants to be watered is at least 100 meters.

* * * * *

(12) POST-GRANT REVIEW CERTIFICATE (176th)

United States Patent
Bletsos et al.

(10) Number: US 9,848,543 J1
(45) Certificate Issued: May 11, 2021

(54) SYSTEM AND METHOD FOR IRRIGATION

(71) Applicants: Ioannis V. Bletsos; Robert R. Matheson; Ji Yeon Huh; Debora Flanagan Massouda

(72) Inventors: Ioannis V. Bletsos; Robert R. Matheson; Ji Yeon Huh; Debora Flanagan Massouda

(73) Assignee: DUPONT SAFETY & CONSTRUCTION, INC.

Trial Number:

PGR2018-00102 filed Sep. 25, 2018

Post-Grant Review Certificate for:

Patent No.: 9,848,543
Issued: Dec. 26, 2017
Appl. No.: 14/307,893
Filed: Jun. 18, 2014

The results of PGR2018-00102 are reflected in this post-grant review certificate under 35 U.S.C. 328(b).

POST-GRANT REVIEW CERTIFICATE
U.S. Patent 9,848,543 J1
Trial No. PGR2018-00102
Certificate Issued May 11, 2021

AS A RESULT OF THE POST-GRANT REVIEW PROCEEDING, IT HAS BEEN DETERMINED THAT:

Claims 1-18 are cancelled.

\* \* \* \* \*